United States Patent
Bangura et al.

(10) Patent No.: US 10,205,372 B2
(45) Date of Patent: Feb. 12, 2019

(54) MOTOR-GENERATOR SHAFT WITH CENTRIFUGAL FAN BLADES

(71) Applicant: Altigreen Propulsion Labs Private Limited, Bangalore (IN)

(72) Inventors: John Bangura, Rockton, IL (US); Lasse Moklegaard, Waverly, IA (US); Amitabh Saran, New Delhi (IN)

(73) Assignee: ALTIGREEN PROPULSION LABS PRIVATE LIMITED, Bangalore (IN)

( * ) Notice: Subject to any disclaimer, the term of this patent is extended or adjusted under 35 U.S.C. 154(b) by 257 days.

(21) Appl. No.: 15/021,926

(22) PCT Filed: Jul. 18, 2014

(86) PCT No.: PCT/IB2014/063203
§ 371 (c)(1),
(2) Date: Mar. 14, 2016

(87) PCT Pub. No.: WO2015/036876
PCT Pub. Date: Mar. 19, 2015

(65) Prior Publication Data
US 2016/0226366 A1 Aug. 4, 2016

(30) Foreign Application Priority Data
Sep. 16, 2013 (IN) .......................... 4138/CHE/2013

(51) Int. Cl.
*H02K 9/00* (2006.01)
*H02K 47/00* (2006.01)
(Continued)

(52) U.S. Cl.
CPC ............. *H02K 47/00* (2013.01); *F04D 17/16* (2013.01); *F04D 29/281* (2013.01);
(Continued)

(58) Field of Classification Search
CPC .. H02K 9/06; H02K 1/32; H02K 1/20; H02K 5/20; H02K 9/005
(Continued)

(56) References Cited

U.S. PATENT DOCUMENTS

| 2,465,262 A | 3/1949 | Packer |
| 3,459,980 A * | 8/1969 | Coroller ................. H02K 21/14 310/114 |

(Continued)

FOREIGN PATENT DOCUMENTS

| DE | 1834602 U | 7/1961 |
| EP | 0462647 A1 | 6/1991 |

(Continued)

OTHER PUBLICATIONS

Indian Patent Office; International Search Report PCT/IB2014/063203; dated Dec. 8, 2014; 3 pages.
(Continued)

*Primary Examiner* — Thanh Lam
(74) *Attorney, Agent, or Firm* — Schwabe Williamson & Wyatt, P.C.

(57) ABSTRACT

Disclosed in the present invention is a shaft construction for motor-generators and alternators that provides effective airflow and improved overall cooling without the need for an external fan. The shaft comprises a plurality of circumferentially disposed centrifugal fan blades and longitudinal cooling channels. As the shaft rotates, the centrifugal fan blades pull the air inwardly across the winding end-turns on one end of the stator into the housing and propels the air at high pressure through the cooling channels along the shaft to cool the rotor inner circumferential surfaces, winding end-turns on the other end of the stator and bearings mounting surfaces, and exhausts through the exhaust vents on the ends of the housing. The airflow path provides effective cooling
(Continued)

of the stator windings, rotor, shaft and bearings that prevents high temperature gradients, thus resulting in improved motor-generator performance.

12 Claims, 3 Drawing Sheets

(51) Int. Cl.
    *H02K 1/28*     (2006.01)
    *H02K 1/32*     (2006.01)
    *H02K 9/06*     (2006.01)
    *F04D 17/16*     (2006.01)
    *F04D 29/28*     (2006.01)
    *F04D 29/58*     (2006.01)
    *H02K 16/00*     (2006.01)
    *H02K 7/00*     (2006.01)
    *H02K 17/16*     (2006.01)

(52) U.S. Cl.
    CPC ............ *F04D 29/582* (2013.01); *H02K 1/28* (2013.01); *H02K 1/32* (2013.01); *H02K 9/06* (2013.01); *H02K 16/00* (2013.01); *H02K 7/003* (2013.01); *H02K 17/165* (2013.01)

(58) Field of Classification Search
    USPC ........................ 310/156.01–156.84
    See application file for complete search history.

(56) References Cited

U.S. PATENT DOCUMENTS

| | | | |
|---|---|---|---|
| 4,904,891 A | 2/1990 | Baker et al. | |
| 6,215,212 B1 * | 4/2001 | Grennan | H02K 1/32 |
| | | | 310/58 |
| 8,698,340 B2 * | 4/2014 | Hu | F03D 3/02 |
| | | | 290/55 |
| 2007/0065317 A1 | 3/2007 | Stock | |
| 2012/0299403 A1 | 11/2012 | Stahlhut | |
| 2013/0028751 A1 | 1/2013 | Rai | |

FOREIGN PATENT DOCUMENTS

| | | |
|---|---|---|
| EP | 0244134 B2 | 8/1998 |
| EP | 0971131 A2 | 7/1999 |
| EP | 1333561 | 8/2006 |
| JP | 5440408 U | 3/1979 |

OTHER PUBLICATIONS

European Patent Office, Extended European Search Report in EP Patent Application No. 14844719.6, dated Apr. 3, 2017, 11 pages.

* cited by examiner

MOTOR-GENERATOR SHAFT WITH CENTRIFUGAL FAN BLADES

FIELD OF THE INVENTION

This present disclosure pertains to a shaft construction for motor-generators and alternators, that provides effective airflow and improvement in the overall thermal cooling without the need for an external fan.

BACKGROUND OF THE INVENTION

In applications with stringent space and thermal constraints, it is highly desirable to provide high power density motor-generators that are compact and capable of operating with high temperature ranges. This requires that space utilization must be maximized in order for the motor-generator to provide maximum possible torque and power outputs under all application needs as well as high ambient temperatures. Belt-driven air-cooled motor-generators today are generally equipped with axial flow fans to provide force air-cooling so that these electric machines can operate at high power and high ambient temperatures. The axial flow fans are typically disposed axially and mounted on one end of the rotor shaft outside of the housing enclosures. The arrangement of an axial flow fan on the shaft of a motor-generator allows air at lower ambient temperatures to be pulled axially from one end of the housing enclosure through the entry vents so that it flows over the motor-generator stator stack and windings and exhausts through the exit vents on the other side of the housing enclosure.

While having an axial flow fan mounted on one end of the rotor shaft to provide airflow and cooling in order to enable an electric motor-generator to be operated at high power levels and high ambient temperatures, it is however using valuable space that can be effectively utilized to increase the output torque and power capabilities of the electric motor-generator. Furthermore, depending on the torque and power demands, ambient temperatures and resulting thermal cooling requirements, the axial length needed for the axial flow fan could be quite substantial, thus reducing the axial length available for the electric motor-generator and significantly limiting its output torque and power capabilities.

Prior art on cooling of electric machines, such as disclosed in the example prior arts US 2012/0299403A1, US 2013/0028751A1, U.S. Pat. No. 4,904,891, EP 0244134B2, EP 0462647A1, and EP 0971131A2, have primarily described solutions that require using coolant fluid and internal or external fans for thermal cooling. These prior arts do not describe solutions that provide effective airflow and improved thermal cooling for electric machines, and particularly, electric machines operating in high ambient temperatures subject to stringent space constraints. The solution disclosed in the present invention uniquely differs from solutions on thermal cooling of electric machines in the prior arts in terms of the technique, constructional features of the shaft and layout of the electric machine that provide effective airflow and improved overall thermal cooling without using a fan, as well as improve the output torque and power capabilities of the electric machine.

Accordingly, the present invention describes a rotor shaft construction that provides effective airflow and improved cooling of a motor-generator, particularly belt-driven air-cooled motor-generator with stringent space constraints, without an external fan that utilizes axial space that can be effectively used to significantly increase the output torque and power capabilities of the motor-generator. The structure of the rotor shaft provides essential advantages over the current state-of-the-art in belt-driven air-cooled motor-generators that are cooled using axial flow fans. These advantages include: (1) providing effective airflow along both the hottest regions of the stator winding end-turns, through the inside of the rotor and axially along the shaft, through the bearing mounting surfaces on both ends of the housing, and thereby providing improved cooling of the entire motor-generator; and (2) enabling improved thermal performance margins which, in turn allow the motor generator to deliver relatively high output torque and power. In comparison, the axial flow fan provides airflow from one end of the motor-generator housing, over the stator windings and exhausts through the exit vents on the other end of the housing with margin airflow, if any, that reaches the rotor, shaft, and bearings mounted on both ends of the shaft.

Furthermore, it has been recognized by the authors of the present invention that the shaft construction when integrated into a belt-driven fan air-cooled motor-generator can yield improvement in output torque and power assist capabilities of the motor-generator that is directly related to the improved airflow and thermal cooling characteristics of the shaft construction.

BRIEF DESCRIPTION OF THE INVENTION

Disclosed in the present invention is a shaft construction for motor-generator operating subject to high engine ambient temperatures and stringent space requirements that provides effective airflow and improvement in the thermal cooling of the overall motor-generator without the need for an external fun. The rotor shaft comprises of a plurality of circumferentially arranged forward radial tip centrifugal fan blades and longitudinal cooling channels. The longitudinal cooling channels are disposed adjacent to the centrifugal fan blades for communicating the airflow through to the other regions of the shaft, rotor and stator winding end-turns and bearing mounting surfaces.

The centrifugal fan blades include radial tips that are oriented in the forward direction of rotation of the shaft rotation. As the rotor rotates in the forward direction during operation of the motor generator, air from the outside is pulled radially inward by the circumferentially arranged centrifugal fan blades through the entry vents on the housing and across the motor-generator winding end-turns on one end. This air is propelled at high pressure by the circumferentially arranged centrifugal fan blades through the circumferentially arranged longitudinal cooling channels on the shaft in the axial direction and over the inner axial surfaces formed by the circumferences of the inner diameters of the rotors, through the motor-generator winding end-turns on the other end and providing additional cooling of the stator windings, and it exhausts through the exit vents on both ends of the housing.

The shaft of the present invention may be constructed as a single integral body with a plurality of circumferentially disposed radial tip centrifugal fan blades and longitudinal cooling channels. The centrifugal fan blades are axially disposed in proximity to the radial path of the airflow from the entry vents on the circumference of the housing in order to enable airflow from the outside to be pulled directly into the cavity formed by the stator winding end-turns on one end of the stators. Once the air is pulled into the cavity formed by the motor-generator winding end-turns on one end of the stators, the rotational motion of the centrifugal fan blades of the shaft churns the air and creates a high pressure in the axial direction that propels the air to flow axially through the longitudinal cooling channels, over the inner axial surfaces formed by the circumferences of the inner diameters of the rotors, across the motor-generator winding end-turns on the other end of the stators as well as bearing mounting surfaces on both end of the housing, and finally exhausts on the low pressure sides through the exits vents on both ends of the housing.

Moreover, the shaft disclosed in the present invention provides the additional advantage of enabling airflow to the bearing, mourning surfaces on both ends of the housing, thus providing cooling to the bearings, reducing hearing temperatures and improving the life of the bearings.

Disclosed in the present invention is a shaft that provides effective airflow path and improved cooling of the stator windings, rotor, shaft and bearings, and thus improved cooling of the overall motor-generator. This approach prevents high temperature gradients in the rotor and shaft that can results in improvement in the performance of the motor-generator.

Also, disclosed is a motor-generator having the shaft of the embodiment of the present invention mounted thereon that takes advantage of the effective airflow and improved thermal cooling characteristics of the shaft construction to achieve improvement in output torque and power capabilities.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

The preferred embodiment of the present invention will be described in detail with reference to the accompanying drawings. It should be understood that although a motor-generator has been used to describe one preferable application, the shaft illustrated in the preferred embodiment of the present invention could be used in other applications.

Figure 1:
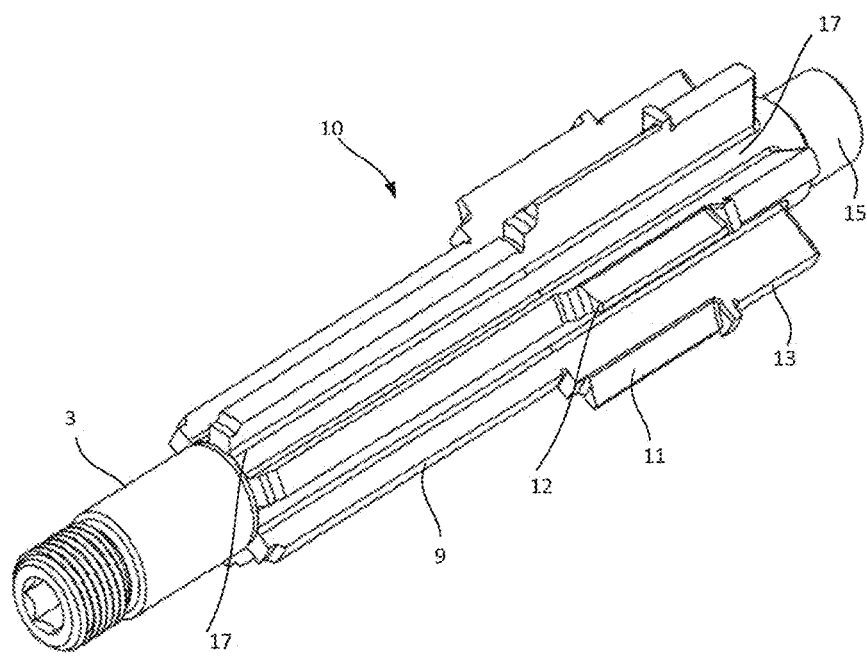
FIG. 1 is an isometric view of the shaft according to a preferred embodiment of the present invention.

FIG. 1 illustrates an isometric view of a shaft, which is referred to herein as assembly 10, according to the preferred embodiment of the present invention. The shaft 10 comprises of a plurality of circumferentially arranged centrifugal fan blades 11 with forward-curved surfaces and radial tips 12, and a plurality of circumferentially arranged longitudinal cooling channels 17 along the entire length of the shaft. The surfaces of the centrifugal fan blades 11 are oriented in the forward direction of rotation for proper functioning when the shaft 10 is rotating in the forward direction. The longitudinal cooling channels 17 are for communicating the airflow in the cavity formed by the motor-generator stator winding end-turns to the other regions of the shaft, rotor, stator winding end-turns and bearing mounting surfaces.

Figure 2:
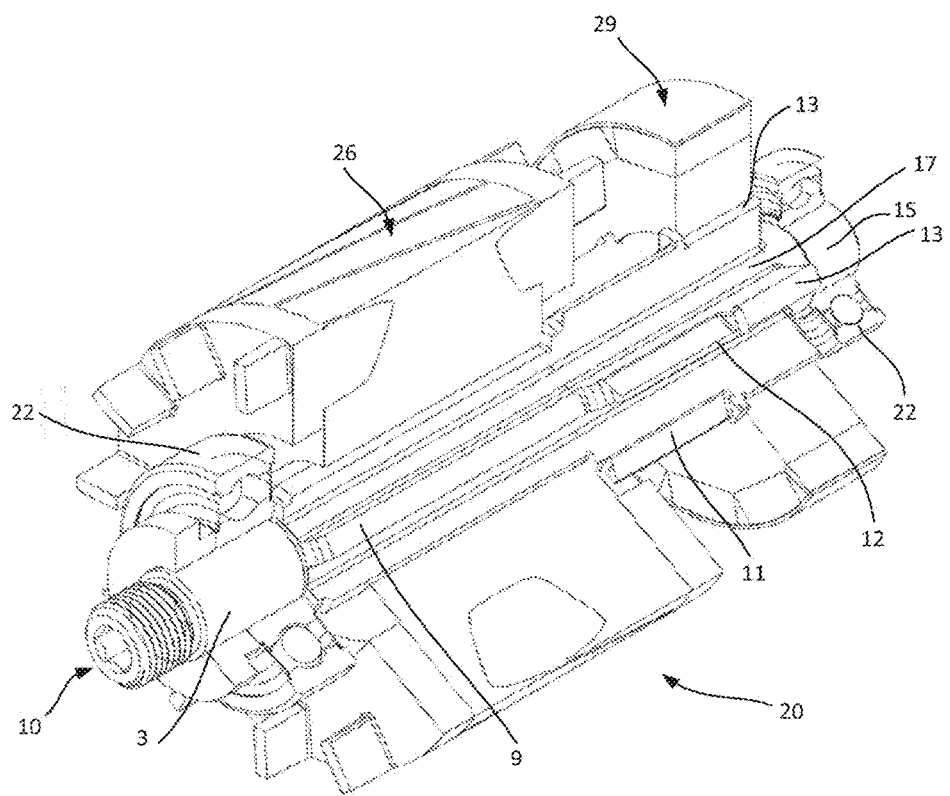
FIG. 2 is an isometric cutout view of a rotor assembly having the shaft according to the preferred embodiment of the present invention.

Referring to FIG. 2 that shows an isometric cutout view of a rotor assembly section having a first rotor assembly 26 and a second rotor assembly 29 both mounted on the shaft. The first rotor assembly 26 and second rotor assembly 29 are mounted on the shaft 10 adjacent to the centrifugal fan blades 11. The embodiment of the present invention shows longitudinal channels 17 of uniform width; however, the longitudinal cooling channels 17 may be constructed such that the widths on both sides adjacent to the centrifugal fan blades 11 are different in order to provide different pressures and airflow to the other regions of a motor-generator. On both end of the shaft 10 are mounted bearings 22 that are cooled by the airflow that exhausts from the longitudinal cooling channels 17.

Figure 3:
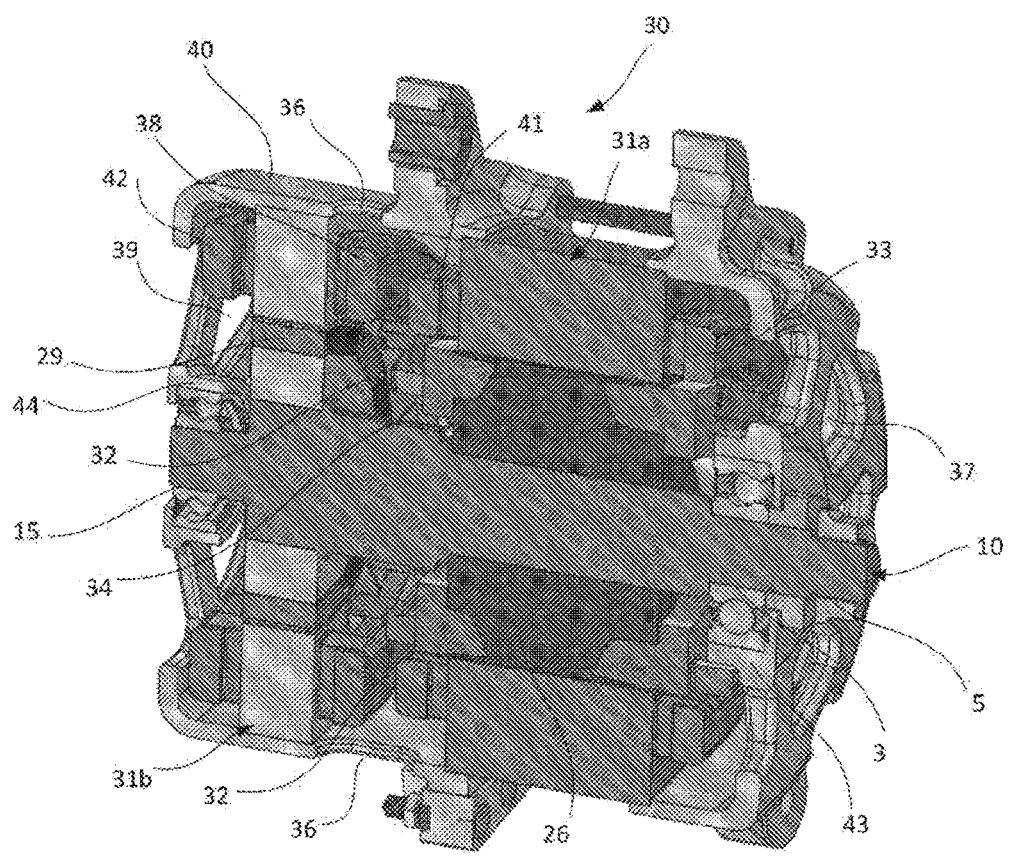
FIG. 3 is a cross-sectional view of a motor-generator that includes a rotor assembly having the shaft according to the preferred embodiment of the present invention.

Now, referring to FIG. 3 that shows an isometric cutout view of a motor-generator 30 comprising the shaft 10, rotor assemblies 26 and 29 and stator assemblies 31a and 31b, wherein the rotor assemblies include bearings 22 mounted onto the shaft 10 on both ends. The axially extending end-turns 38 and 41 of the stator windings are disposed in proximity to the circumferentially disposed entry vents 36 on the outer diameter of the housing 40 and are separated by a small gap in order for air to be pulled into the cavity formed by the axially extending end-turn 38 and 41. The axially extending end-turns 33 and 42 of the stator windings on the other end are disposed in proximity to the exhaust vents 37 and 39 located radially outward from the shaft 10 on both ends of the housing 40.

During operation of the motor-generator 30, the shaft 10 rotates and air from the outside of the housing 40 is pulled radially inwardly by the centrifugal fan blades 11 through the entry vents 36 on the housing and across the gap between the axially extending end-turns 38 and 41 into the cavity formed by said end-turns. Once the air is pulled into the cavity formed by the motor-generator winding end-turns 38 and 41 on one end of the stator 31a and 31b, the rotational motion of the centrifugal fan blades 11 on the shaft 10 churns the air and creates a high pressure in the axial direction that propels the air to flow axially in opposite directions through the circumferentially disposed longitudinal cooling channels 17 on the shaft 10, along the rotor inner surfaces in the axial direction formed by the circumferences of the inner diameters of the rotor assembly 26 and rotor assembly 29, through the axially extending winding end-turns 33 and 42 on the other side of the stators 31a and 31b and providing additional cooling along the way, over the bearing mount surfaces on both ends of the housing, and exhausts on the low pressure side through the exhaust vents 37 and 39 located radially outward from the shaft 10 on both ends of the housing.

The effective airflow pattern is realized due to the constructional features of the shaft in combination with the stator windings end-turn layouts, rotor, shaft and housing designs of the motor-generator 30. The solution disclosed in the present invention provides cooling to the stator windings, rotor, shaft and bearings, thereby providing substantial cooling of the overall motor-generator and improving its performance.

The present invention is also directed to a motor-generator 30 that comprises the shaft 10. The shaft 10 construction provides a means to deliver effective and improve cooling to the motor-generator 30 such that improved performance can be achieved. During operation of the motor-generator 20, the shaft 10 rotates, creating a low pressure, and air is pulled from the outside of the housing 40 inwardly into the cavity formed by the axially extending stator winding end-turns 38 and 41. The air is then churned by the circumferentially arranged centrifugal fan blades 11 to create a high pressure that propels the air axially in opposite directions along the circumferentially arranged longitudinal cooling channels 17 on the shaft 10. The air then flows in the axial directions along the rotor inner surfaces formed by the circumferences of the inner diameters of the rotor assembly 26 and rotor assembly 29, through the axially extending winding end-turns 33 and 42 on the other side of the stators 31a and 31b and providing additional cooling along the way, over the bearing mounting surfaces 43 and 44 in the housing on both ends, and exhausts on the low pressure side through the exhaust vents 37 and 39 located radially outward from the shaft on both ends of the housing.

Furthermore, the combination of the shaft 10 construction and the layout of the motor-generator 30 is essential in that it enables the airflow to reach the bearing mourning surfaces 43 and 44 in the housing, and thereby providing cooling that improves the life of the bearings and hence overall life of the motor-generator 30. Also, this combination enables the major assemblies of the motor-generator 30 that includes stators 31a and 31b, rotors 26 and 29, shaft 10 and bearing mounting surfaces 43 and 44 in the housing 40 on both ends to receive airflow and thermal cooling that prevents high temperature gradients, thus resulting in improved motor-generator performance.

While the invention has been described with reference to specific embodiments, it will be understood by those skilled in the art that various changes may be trade and equivalents may be substituted for elements thereof without departing from the scope of the invention. In addition, many modifications may be made to adapt a particular situation or material to the teachings of the invention without departing from the essential scope thereof. Accordingly, it is intended that the invention not be limited to the particular embodiment disclosed herein as the best mode contemplated for carrying out this invention, but that the invention will include all embodiments falling within the scope of the claims.

We claim:

1. A shaft for use in a motor-generator, the shaft comprising:
    a shaft body having a central core and a plurality of circumferentially disposed opened longitudinal channels having circumferential mounting surfaces for adjacently mounting dual rotors, wherein the plurality of circumferentially disposed open longitudinal channels is formed with a plurality of blades that are disposed between said dual rotors such that the axial length of the said blades is confined to the axial space between said dual rotors.

2. The shaft body as set forth in claim 1, wherein the plurality of circumferentially disposed open longitudinal channels from airflow cooling channels, and wherein the airflow cooling channels are of uniform widths along the length of the shaft.

3. The shaft body as set forth in claim 1, wherein said blades have forward radial tips that are oriented in the forward direction of rotation of the shaft with the leading sides having forward curved surfaces and the trailing side having straight surfaces.

4. The shaft body as set forth in claim 1, wherein the plurality of circumferentially disposed open longitudinal channels form airflow cooling channels, and wherein said blades push air in opposite directions along the airflow cooling channels on opposite sides of said blades in response to rotation of the shaft.

5. A motor-generator rotor assembly comprising:
    dual rotors;
    a shaft body having a central core and a plurality of circumferentially disposed opened longitudinal channels having circumferential mounting surfaces for adjacently mounting said dual rotors, wherein the plurality of circumferentially disposed open longitudinal channels is formed with a plurality of blades that are disposed between said dual rotors such that the axial length of the said blades is confined to the axial space between said dual rotors; and
    a plurality of circumferentially disposed closed longitudinal channels disposed on both sides of said blades and formed by said plurality of circumferentially disposed opened longitudinal channels and inner circumferential surfaces of said dual rotors to receive the shaft body.

6. The shaft body as set forth in claim 5, wherein the plurality of circumferentially disposed opened longitudinal channels and the plurality of circumferentially disposed closed longitudinal channels from airflow cooling channels, and wherein the airflow cooling channels are of uniform widths along the length of the shaft body.

7. The shaft body as set forth in claim 5, wherein said blades have forward radial tips that are oriented in the forward direction of rotation of the shaft body with the leading sides having forward curved surfaces and the trailing side having straight surfaces.

8. The shaft body as set forth in claim 5, wherein the plurality of circumferentially disposed open longitudinal channels and the plurality of circumferentially disposed closed longitudinal channels from airflow cooling channels, and wherein said blades push air in opposite directions along the airflow cooling channels on opposite sides of said blades in response to rotation of the shaft body.

9. A motor-generator comprising:
    a stator;
    dual rotors;
    a shaft body having a central core and a plurality of circumferentially disposed opened longitudinal channels having circumferential mounting surfaces for adjacently mounting said dual rotors is formed with a plurality of blades that are disposed between said dual rotors such that the axial length of the said blades is confined to the axial space between said dual rotors; and
    a plurality of circumferentially disposed closed longitudinal channels disposed on both sides of said blades and formed by said plurality of the circumferentially disposed opened longitudinal channels and inner circumferential surfaces of said dual rotors to receive the shaft body.

10. The shaft body as set forth in claim 9, wherein the circumferentially disposed opened longitudinal channels and the circumferentially disposed closed longitudinal channels from airflow cooling channels, and wherein the airflow cooling channels are of uniform widths along the length of the shaft body.

11. The shaft body as set forth in claim 9, wherein said blades have forward radial tips that are oriented in the forward direction of rotation of the shaft body with the leading sides having forward curved surfaces and the trailing side having straight surfaces.

12. The shaft body as set forth in claim 9, the plurality of circumferentially disposed open longitudinal channels and the plurality of circumferentially disposed closed longitudinal channels form airflow cooling channels, and wherein said blades push air in opposite directions along the airflow cooling channels on opposite sides of said blades in response to rotation of the shaft body.

* * * * *